United States Patent
Corio et al.

(10) Patent No.: US 6,402,259 B2
(45) Date of Patent: Jun. 11, 2002

(54) ELECTROMECHANICAL BRAKING SYSTEM WITH POWER DISTRIBUTION AND REDUNDANCY

(75) Inventors: Lawrence F. Corio; Robert L. Brundrett, both of Troy, OH (US); Mihai Ralea, Boonton, NJ (US); Rollin W. Brown, Colchester, VT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 09/357,341

(22) Filed: Jul. 14, 1999

Related U.S. Application Data

(60) Provisional application No. 60/124,816, filed on Mar. 17, 1999.

(51) Int. Cl.[7] .............................................. B60T 15/14
(52) U.S. Cl. ....................... 303/20; 303/9.63; 244/111; 701/71; 701/76
(58) Field of Search ........................ 303/20, 2, 3, 9.63, 303/122, 122.03; 244/111, 110 A; 701/29, 33, 36, 70, 71, 76

(56) References Cited

U.S. PATENT DOCUMENTS

| | | | |
|---|---|---|---|
| 2,869,807 A | 1/1959 | Hyland et al. | |
| 2,957,658 A | 10/1960 | Nichols | |
| 3,917,356 A | 11/1975 | DeVieg | |
| 3,920,204 A | 11/1975 | Bissell et al. | |
| 3,926,479 A | * 12/1975 | Bissell et al. | 303/20 |
| 4,062,507 A | 12/1977 | Felder | |
| 4,493,210 A | 1/1985 | Fries et al. | |
| 4,683,538 A | 7/1987 | Guichard | |
| 4,784,442 A | 11/1988 | Petersen | |
| 4,792,192 A | 12/1988 | Tveitane | |
| 4,923,056 A | 5/1990 | Nedelk | |
| 5,050,940 A | 9/1991 | Bedford et al. | |
| 5,170,343 A | * 12/1992 | Matsuda | 364/184 |
| 5,397,173 A | * 3/1995 | Bourguet | 303/2 |
| 5,472,264 A | * 12/1995 | Klein et al. | 303/3 |
| 5,754,021 A | 5/1998 | Kojima | |
| 5,952,799 A | 9/1999 | Maisch et al. | |
| 5,954,407 A | 9/1999 | Schramm et al. | |
| 5,961,190 A | * 10/1999 | Brandmeier et al. | 303/152 |
| 6,038,500 A | * 3/2000 | Weiss | 701/22 |
| 6,081,081 A | 6/2000 | Maisch | |
| 6,142,026 A | 11/2000 | Ohashi et al. | |

FOREIGN PATENT DOCUMENTS

| | | |
|---|---|---|
| DE | 4227157 | 8/1992 |
| EP | 0229559 | 12/1986 |
| EP | 0499515 | 2/1992 |
| EP | 0614805 | 9/1994 |
| WO | 9608396 | 3/1996 |

* cited by examiner

*Primary Examiner*—Pam Rodriguez
(74) *Attorney, Agent, or Firm*—Renner, Otto, Boisselle & Sklar

(57) ABSTRACT

An electromechanical braking system utilizes redundancy features to provide safe and reliable braking. The braking system is configured to operate on power provided by multiple power sources. Different modes of braking are available based on whether a failure has occurred in one or more power sources. Additionally, system redundancy allows for failure in one or more primary components without total loss of braking capacity. Proportional braking is provided even in an emergency braking mode.

16 Claims, 15 Drawing Sheets

ELECTROMECHANICAL BRAKING SYSTEM WITH POWER DISTRIBUTION AND REDUNDANCY

CROSS-REFERENCE TO RELATED APPLICATION

This application claims priority under 35 USC §119(e) to U.S. Provisional Application No. 60/124,816, filed Mar. 17, 1999.

TECHNICAL FIELD

The present invention relates generally to brake systems for vehicles, and more particularly to an electromechanical braking system for use in aircraft.

BACKGROUND OF THE INVENTION

Various types of braking systems are known. For example, hydraulic, pneumatic and electromechanical braking systems have been developed for different applications. In the past, however, it has not been shown to employ reliably an electromechanical braking system in a vehicle such as an aircraft.

An aircraft presents a unique set of operational and safety issues. For example, uncommanded braking due to failure can be catastrophic to an aircraft during takeoff. On the other hand, it is similarly necessary to have virtually fail-proof braking available when needed (e.g., during landing).

If one or more engines fail on an aircraft, it is quite possible that there will be a complete or partial loss of electrical power. In the case of an electromechanical braking system, issues arise as to how the brakes will be actuated in an emergency landing.

In view of such shortcomings associated with conventional electromechanical braking systems, there is a strong need in the art for an electromechanical braking system which may be employed reliably even on a vehicle such as an aircraft.

SUMMARY OF THE INVENTION

An electromechanical braking system utilizes redundancy features to provide safe and reliable braking. The braking system is configured to operate on power provided by multiple power sources. Different modes of braking are available based on whether a failure has occurred in one or more power sources. Additionally, system redundancy allows for failure in one or more primary components without total loss of braking capacity. Proportional braking is provided even in an emergency braking mode.

According to one aspect of the invention, an electromechanical braking system is provided which includes at least one electromechanical brake actuator for effecting a braking torque on a wheel of a vehicle; and a plurality of brake controllers for providing drive control signals to the at least one electromechanical brake actuator in response to an input brake command signal to effect the braking torque. The plurality of brake controllers are configured to function redundantly so as to provide the drive control signals to effect the braking torque even in the event one of the plurality of brake controllers becomes inoperative.

In accordance with another aspect of the invention, an electromechanical braking system is provided which includes a plurality of brake actuators for effecting a braking torque on wheels of a vehicle; a plurality of electromechanical actuator controllers (EMACs) for providing drive control of the brake actuators in response to brake clamp force command signals; and at least one brake control unit (BSCU) for converting an input brake command signal into the brake clamp force command signals which are provided to the EMACs. At least two of the plurality of EMACs are configured to function redundantly in providing drive control to the brake actuators in response to the brake command signals.

According to still another aspect of the invention, an electromechanical braking system is provided which includes a plurality of brake actuators for effecting a braking torque on wheels of a vehicle; at least one electromechanical actuator controller (EMAC) for providing drive control of the brake actuators in response to brake clamp force command signals; and a plurality of brake control units (BSCUs) for converting an input brake command signal into the brake clamp force command signals which are provided to the at least one EMAC. At least two of the plurality of BSCUs are configured to function redundantly in providing brake clamp force command signals to the at least one EMAC in response to the input brake command signal.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described with reference to the drawings, wherein like reference labels are used to refer to like elements throughout.

Figure 1:
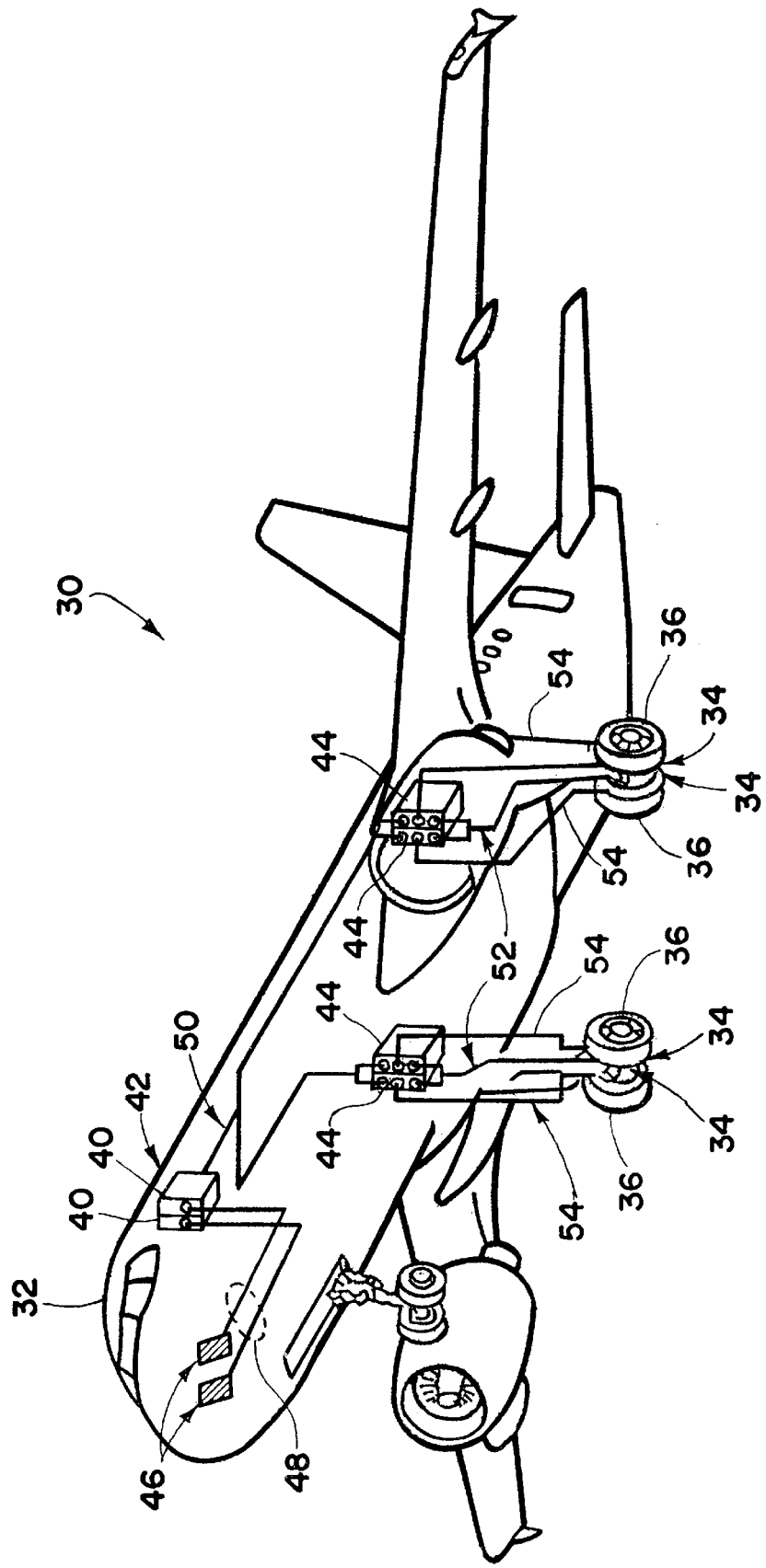
FIG. 1 is an environmental view of an electromechanical braking system in an aircraft in accordance with the present invention.

Referring initially to FIG. 1, an electromechanical braking system 30 in accordance with the present invention is shown within a jet aircraft 32 (illustrated in phantom). As will be explained in more detail below, the system 30 is designed as a brake-by-wire system compatible with the performance, safety, electrical and mechanical interfaces, redundancy, and other requirements of an aircraft such as a commercial transport. The system 30 operates based on power provided from a plurality of power sources. Power is segregated within the system 30 such that the system 30 is capable of providing satisfactory braking even upon failure of one or more power sources. Moreover, the system 30 has built in redundancy which allows the system 30 to continue to operate satisfactorily even in the case of failure of one or more system components.

In the exemplary embodiment, the system primary components include four electromechanical brakes 34. The aircraft 32 in the present embodiment includes a pair of wheels 36 mounted to a landing gear under the left wing of the aircraft and a pair of wheels 36 mounted to a landing gear under the right wing of the aircraft. Each wheel 36 includes a respective brake 34 for providing braking action thereto.

The system 30 further includes two redundant digital brake system control units (BSCUs) 40. As will be described in more detail below, the BSCUs 40 carry out the brake control and antiskid processing functions. The BSCUs 40 are located in the electronics bay 42 of the aircraft 32, and preferably are packaged into one enclosure with a firewall therebetween.

The system 30 also includes four redundant electromechanical actuator controllers (EMACs) 44 which convert brake clamp force commands from the BSCUs 40 to servo motor control signals which ultimately provide actuator braking forces. The EMACs 44 preferably are packaged similar to the BSCUs 40, with two EMACs 44 per enclosure located near the top of the gear strut of each respective landing gear.

A pilot of the aircraft 32 provides brake commands to the braking system 30 via a pair of left and right brake pedal transducers 46 included in the cockpit. The transducers 46 provide brake command signals to the BSCUs 40 which are proportional to the desired amount of braking. The output of each transducer 46 is coupled to the BSCUs 40 via a cable 48. Communications between the BSCUs 40 and the EMACs 44 occur over a communication bus 50 connected therebetween.

Each of the EMACs 44 is designed to provide electrical power to the electromechanical actuators within the corresponding brakes 34 via a respective power cable 52. In addition, each brake 34 has an associated torque sensor and wheel speed sensor as described below. The outputs of the sensors are provided to the respective EMACs 44 via cables 54. The EMACs 44 condition the signals and provide them to the BSCUs 40 as feedback signals to carry out the brake control and antiskid processing functions.

Figure 2:
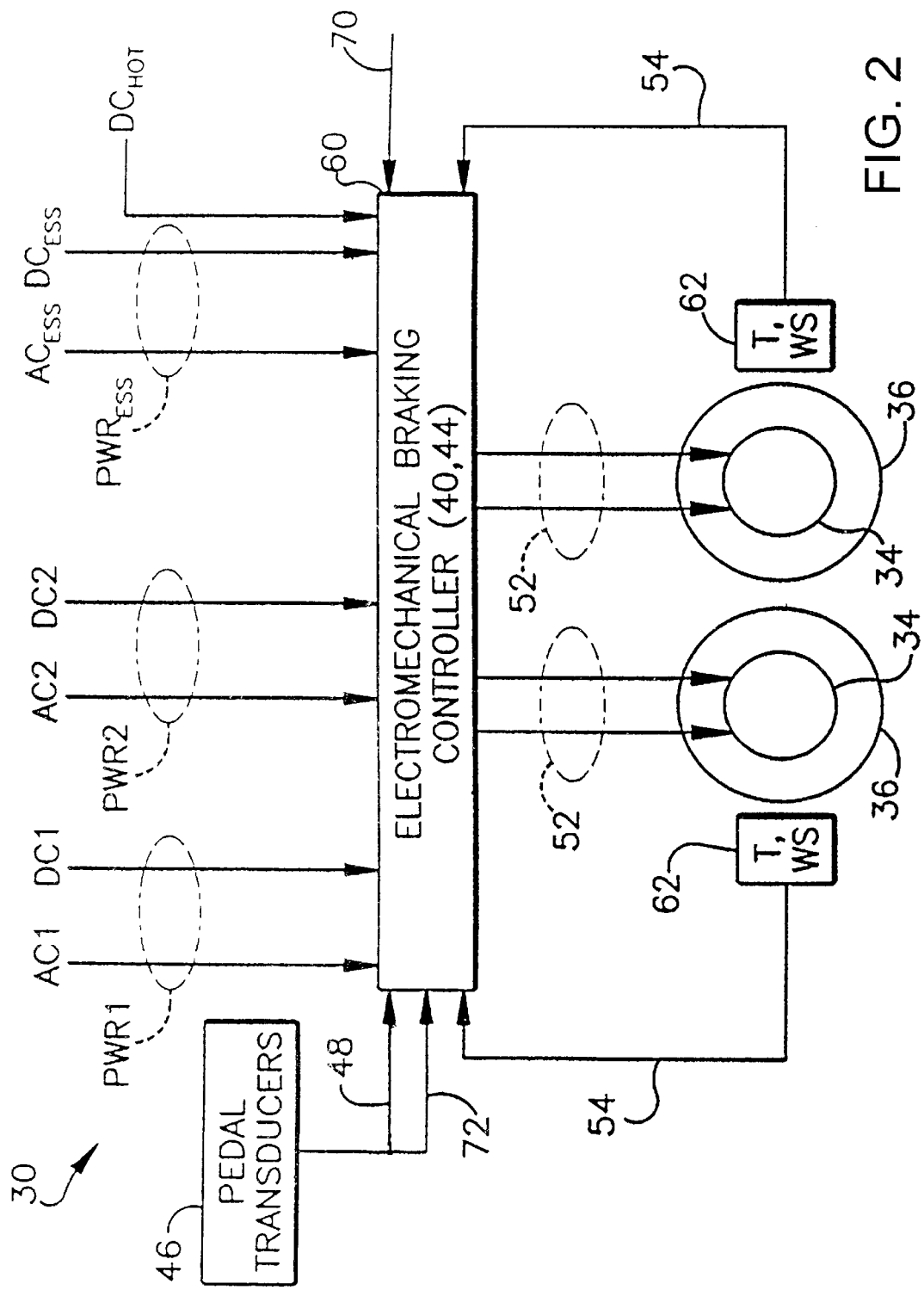
FIG. 2 is a general block diagram of the electromechanical braking system in accordance with the present invention.

FIG. 2 is a simplified block diagram of the braking system 30 as employed within the aircraft 32. The BSCUs 40 and the EMACs 44 are shown collectively as an electromechanical braking controller 60. The controller 60 receives as its primary inputs the brake command signals from the transducers 46, and the outputs of the torque and wheel speed sensors 62 included as part of the brake 34 on each wheel 36.

The braking system 30 receives power from three primary power busses and a secondary power bus included within the aircraft 32. As is known, an aircraft 32 oftentimes will include multiple power busses. In the exemplary embodiment, the aircraft 32 includes primary power busses PWR1, PWR2 and PWRess. Each power buss preferably is independent of one or more of the other power busses to provide a level of redundancy. For example, the power buss PWR1 consists of an alternating-current (AC) power source AC1 and a commonly generated direct-current (DC) power source DC1. Similarly, the power buss PWR2 consists of an AC power source AC2 and a commonly generated DC power source DC2; and the power buss PWRess consists of an AC power source ACess and a commonly generated DC power source DCess.

The power buss PWR1 (i.e., AC1 and DC1) may be derived from power generated by the left wing engine in the aircraft 32, for example. Similarly, the power buss PWR2 (i.e., AC2 and DC2) may be derived from power generated by the right wing engine. In this manner, if the left wing engine or the right wing engine fails, power is still available to the system 30 via the power buss corresponding to the other engine.

The power buss PWRess (i.e., ACess and DCess) may be derived from power generated by the parallel combination of the left wing engine and the right wing engine. In such manner, power from the power buss PWRess will still be available even if one of the engines fail.

The aircraft 32 further includes an emergency DC power buss represented by a DChot power source. The DChot power source is a battery supply on board the aircraft 32. The battery may be charged via power from one of the other power sources, or may be charged separately on the ground.

As will be appreciated, various circumstances can arise where power from one or more of the power busses will become unavailable. For example, the left wing engine or the right wing engine could fail causing the PWR1 (AC1/DC1) and PWR2 (AC2/DC2) power sources to go down, respectively. Alternatively, power generating equipment such as a generator, inverter, or other form of power converter could fail on one of the respective power busses resulting in the AC1/DC1, AC2/DC2 and/or ACess/DCess power sources becoming unavailable. In addition, a failure can occur in the cabling providing the power from the respective power sources to the system 30, thus effectively causing the respective power source to no longer be available. For this reason, the routing of the power cables for the different busses preferably occurs along different routes throughout the plane to avoid catastrophic failure on all the power buss cables at the same time.

Figure 3:
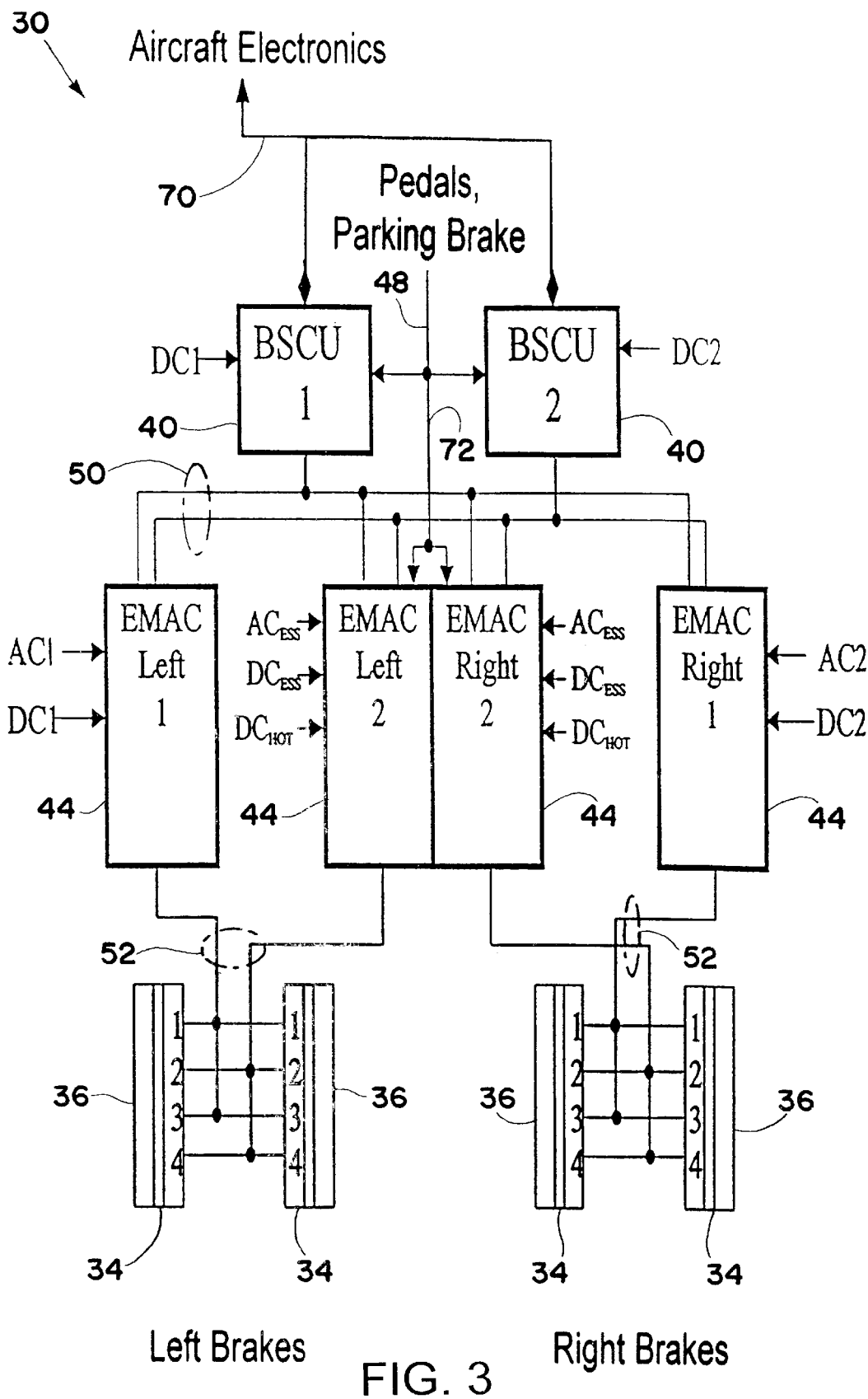
FIG. 3 is a detailed block diagram of the electromechanical braking system in accordance with the present invention.

Turning now to FIG. 3, the braking system 30 is illustrated in more detail. As noted above, the system 30 includes two BSCUs 40 designated BSCU1 and BSCU2, respectively. BSCU1 and BSCU2 are redundant and are both configured to provide an input/output interface to the aircraft 32 electronics within the cockpit, for example, via a bus 70. In addition, BSCU1 and BSCU2 each contain circuitry for performing top level brake control and antiskid algorithm processing functions. BSCU1 and BSCU2 each receive proportional brake command signals from the transducers 46 via cable 48.

BSCU1 and BSCU2 are each designed to receive the proportional brake command signals from the transducers 46 and process the signals based on the aforementioned brake control and antiskid algorithms to produce a brake command signal which is provided to the EMACs 44. The particular brake control and antiskid algorithms employed by the BSCUs 40 can be conventional, and hence further detail based thereon is largely omitted in the present description for sake of brevity.

BSCU1 and BSCU2 each provide brake commands and otherwise communicate with the EMACs 44 via the aforementioned communication bus 50. As noted above, the system 30 includes four redundant EMACs 44 respectively labeled EMAC Left1, EMAC Left2, EMAC Right1 and EMAC Right2. As shown in FIG. 3, each EMAC 44 is coupled to the communication bus 50 so as to be able to receive brake commands from each of the BSCUs 40 and otherwise communicate with the other devices coupled to the bus 50. The EMACs 44 receive the left and right brake commands from the BSCUs 40 and provide control signals to actuator modules within the brakes 34 as discussed below to drive the actuator modules to their commanded position or clamp force. In this manner, controlled braking may be effected.

Each brake 34 included in the system 30 includes four separate actuator modules (designated by numerals 1–4), although a different number may be employed without departing from the scope of the invention. Each actuator module 1–4 includes an electric motor and actuator (not shown) which is driven in response to electrical control signals provided by a respective EMAC 44 to exert mechanical braking torque on a respective wheel 36. Each EMAC 44 controls half of the actuator modules 1–4 for the wheels 36 on either the left wing landing gear or the right wing landing gear. Thus, EMAC Left1 provides control to actuator modules 1 and 3 of each of the wheels 36 in the left side landing gear (representing the left brakes) via cable 52. Similarly, EMAC Left2 has its output coupled to the remaining actuator modules 2 and 4 of the wheels 36 in the left side landing gear via cable 52. EMAC Right1 similarly provides power to the actuator modules 1 and 3 for the wheels 36 in the right side landing gear (representing the right brakes), and EMAC Right2 provides power to the remaining actuator modules 2 and 4 in the right side landing gear via another cable 52.

Thus, when the system 30 is fully operational (i.e., during normal operation) each of the EMACs 44 receives brake commands from BSCU1 and BSCU2 which will be generally redundant. Nevertheless, the EMACs 44 may be configured to give commands provided by BSCU1 priority or vice versa. In the event commands are not received from one of the BSCUs 40, the EMACs 44 are configured to default to the other BSCU 40. During normal operation, all four actuator modules 1–4 will receive brake control signals from their respective EMAC 44 to provide full braking.

Although not shown in FIG. 3, the outputs of the wheel speed and torque sensors 62 (if used) for each brake 34 are coupled to the respective EMACs 44 via the cables 54 (FIG. 2). The EMACs 44 are configured to condition the signals and provide the measured wheel speed and torque to the BSCUs 40 via the communication bus 50. The BSCUs 40 in turn use such information in a conventional manner for carrying out brake control and antiskid processing.

As is shown in FIG. 3, EMAC Left2 and EMAC Right2 differ from the remaining EMACs in that they also receive left and right proportional brake commands directly from the transducers 46 via a separate cable 72 (not shown in FIG. 1). As is discussed in more detail below, such direct input of the brake commands from the transducers 46 is used during emergency braking operations. Also, EMAC Left2 and EMAC Right2 receive a parking brake control signal from a switch located in the cockpit via the cable 72 for carrying out a parking brake operation as described below.

Continuing to refer to FIG. 3, both BSCU1 and BSCU2 are designed to operate on DC power. However, BSCU1 is coupled to the DC1 power source and BSCU2 is coupled to a different power source, namely the DC2 power source. Thus, different power busses (e.g., PWR1 and PWR2) are used to supply operating power to the respective BSCUs 40. Similarly, EMAC Left1 and EMAC Right1 are designed to operate on power from the different power busses PWR1 and PWR2, respectively. Specifically, EMAC Left1 receives AC operating power from the AC1 source and DC operating power from the DC1 source. EMAC Right1 receives AC operating power from the AC2 source and DC operating power from the DC2 source.

EMAC Left2 and EMAC Right2 are configured to operate on power from the PWRess power buss. Specifically, both EMAC Left2 and EMAC Right2 receive AC operating power from the ACess source and DC operating power from the DCess source. In addition, EMAC Left2 and EMAC Right2 are designed to operate in an emergency mode based on power provided by the DChot bus as discussed below.

The system 30 is designed to carry out built-in testing among the EMACs 44 to detect the loss of power from any of the primary power busses PWR1, PWR2 and PWRess. Such built-in testing can be carried out by configuring the EMACs 44 to poll each other via the communication bus 50, for example. If an EMAC 44 fails to respond to polling by another, for example, it can be assumed that power from the particular power buss servicing the EMAC 44 is unavailable or that the EMAC 44 itself has failed. The polling EMACs 44 then communicate such information to the BSCUs 40 via the bus 50. The BSCUs 40 in turn command the functioning EMACs 44 to revert to an alternate mode of braking. Other techniques for detecting the loss of power on one of the power busses or the failure of one of the components can be used without departing from the scope of the invention as will be appreciated.

For example, the BSCUs 40 may instead be configured to poll each EMAC 44 via the communication bus 50. If an EMAC 44 fails to respond, the BSCU(s) 40 recognize the problem EMAC 44 and in turn command the functioning EMACs 44 to revert to an alternate mode of braking.

Braking Modes

The braking system 30 includes five primary operating modes for purposes of the present invention, including a normal mode, alternate mode 1, alternate mode 2, emergency mode and park (ultimate) mode. In each mode braking is available despite failure of a power buss, etc., as will now be explained with reference to FIGS. 4A–4D and 5A–5B.

FIGS. 4A–4D and 5A–5B illustrate the state of respective power busses and components within the system 30 with respect to time during different failure modes. A line level "A" in the figures indicates that the power buss or component is available and operational. A line level "IN" indicates that the power buss or component is inactive or unavailable. With respect to a line level between "A" and "IN", this indicates that the brakes or components are partially available or operational as will be further described below.

Normal Mode

Figure 4A:
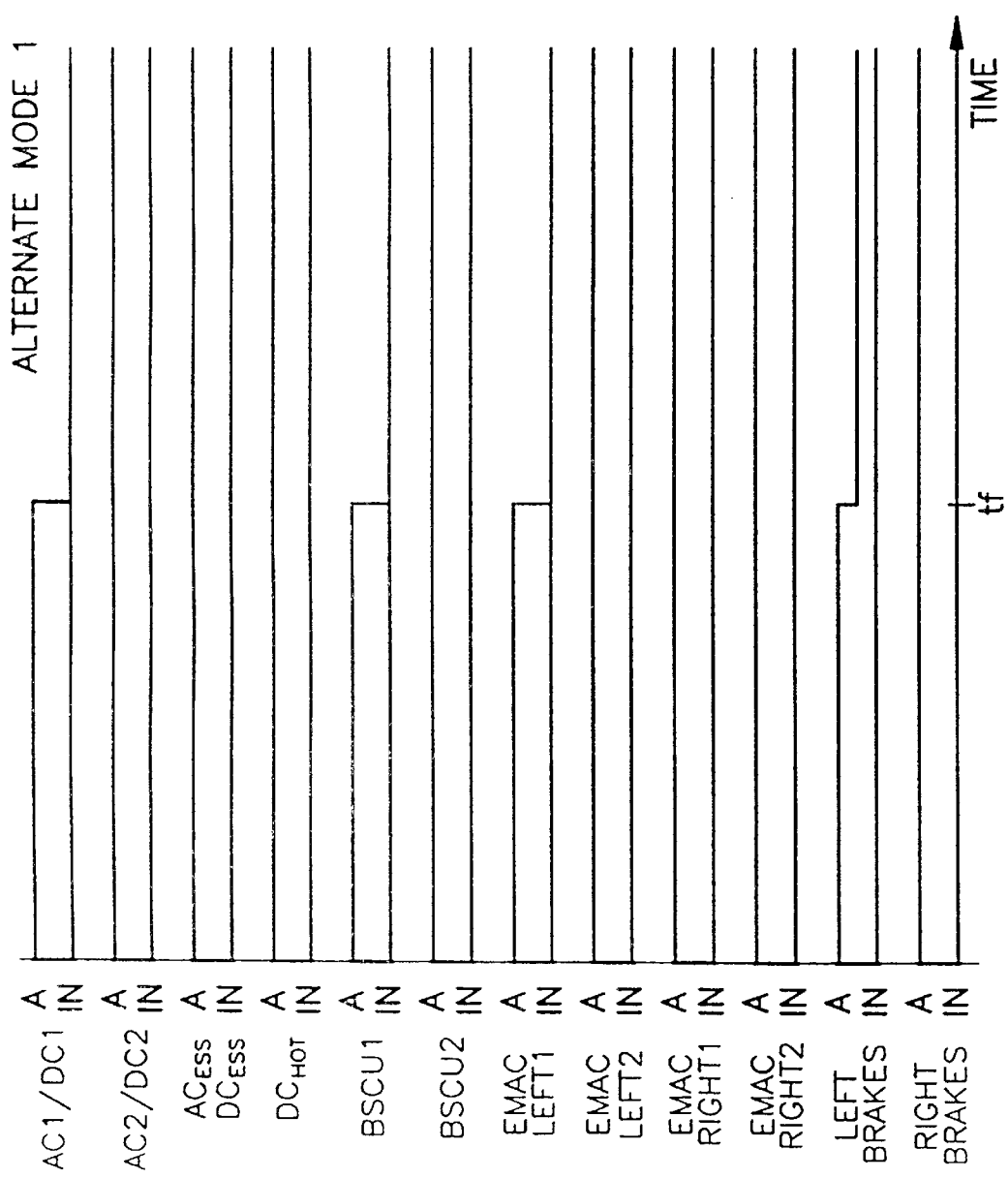
FIG. 4A is a timing diagram illustrating operation of the electromechanical braking system in a first alternate braking mode in which a primary AC power source has failed.

Normal mode operation is defined as operation during which power from all the primary power busses PWR1, PWR2 and PWRess is available, and the BSCUs 40 and EMACs 44 are functional. Referring initially to FIG. 4A, normal mode operation is shown at a time prior to a failure time tf. As is shown, all of the power busses are available, the BSCUs 40 and EMACs 44 are receiving power and are operational. Moreover, each of the actuator modules 1–4 in the left brakes and right brakes are powered and operational.

Alternate Mode 1

Alternate mode 1 is defined as operation during which the power buss PWR1 or PWR2 is unavailable due to failure, for example, but the power buss PWRess remains available.

FIG. 4A illustrates a particular example where, at a failure time tf, the power buss PWR1 (AC1/DC1) fails. As noted above, such failure may occur due to engine failure, power converter failure, broken power cable, etc. Since BSCU1 is powered by the power buss PWR1, BSCU1 will stop functioning at time tf as represented in FIG. 4A. However, since BSCU1 and BSCU2 are redundant and BSCU2 still receives operating power from the power buss PWR2 (AC2/DC2), brake control operation and antiskid processing may still be carried out.

Since EMAC Left1 receives power from the power buss PWR1, it also becomes unavailable at time tf. Because EMAC Left1 becomes unavailable, the actuator modules 1 and 3 controlled by the EMAC in the left brakes are disabled. Nevertheless, each of the remaining EMACs 44 remain operational. Accordingly, two of the four actuator modules (i.e., 2 and 4) remain available for braking as controlled by the EMAC Left2. Ordinarily this would result in a loss of 50% of the total available braking force on the left wheels 36. However, the EMACs 44 are designed to increase the upper force limit exerted by the respective actuator modules 1–4 in the alternate mode.

For example, the limit for the maximum braking force applied by each of the remaining two actuators 2 and 4 is increased by the EMAC Left2 by 60%. Hence, the total braking force for the left brakes can achieve 80% of the normal braking capability. In another example, the maximum braking force limit can be adjusted by some other amount.

The aforementioned built-in testing detects the loss of the power buss PWR1. This results in the BSCU2 informing the EMAC Left2 to increase the braking force limit. Even absent such compensation, 50% braking is still available. Thus, as is shown in FIG. 4A, partial braking for the left brakes is available even after time tf.

Similar operation to that shown in FIG. 4A would occur if the power buss PWR2 (AC2/DC2) failed rather than the power buss PWR1. In such case, however, BSCU1 would remain operational and BSCU2 would fail. Similarly, EMAC Right 1 would fail and the remaining EMACs 44 would continue to operate. The actuator modules 1 and 3 in the right brakes would be disabled, but the EMAC Right2 would increase the maximum force limit of the actuator modules 2 and 4, similar to that previously described.

Alternate Mode 2

Alternate mode 2 is defined as operation during which the power buss PWRess is unavailable due to failure, for example, but the power busses PWR1 and PWR2 remain available.

Figure 4B:
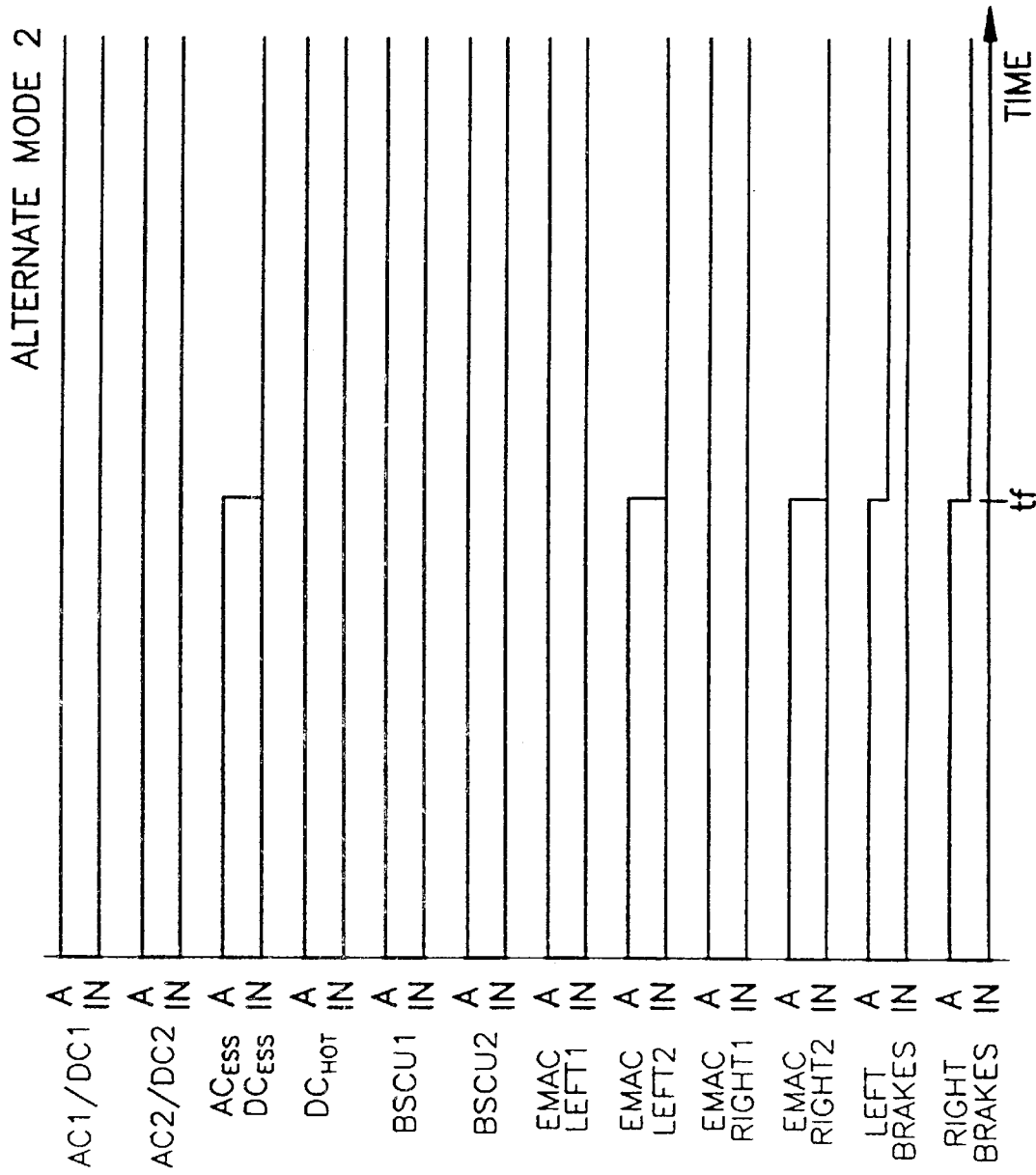
FIG. 4B is a timing diagram illustrating operation of the electromechanical braking system in a second alternate braking mode in which an essential primary AC power source has failed.

For example, FIG. 4B illustrates how the power buss PWRess fails at time tf while power busses PWR1 and PWR2 remain active. In such case, EMAC Left2 and EMAC Right2 are considered unavailable by the system 30 as shown. Although EMAC Left2 and EMAC Right2 receive power from the DChot bus, such power is utilized only in the emergency mode discussed below.

Since EMAC Left2 and EMAC Right2 are not operational, the actuator modules 2 and 4 for each of the brakes 34 for the left and right wheels 36 are disabled. In this case, only 50% of the actuator modules 1–4 are active for each of the brakes 34. Nevertheless, failure of the PWRess is detected and the BSCUs 40 instruct the remaining EMAC Left1 and EMAC Right1 to increase the force limits of the active actuator modules 1 and 3 so as to provide a higher percentage of the normal braking force. Again, this reduced braking function in the left and right brakes is reflected in FIG. 4B.

Emergency Mode

The emergency mode is defined as failure of all the primary power sources PWR1, PWR2 and PWRess. Only the DChot power source remains available.

Figure 4C:
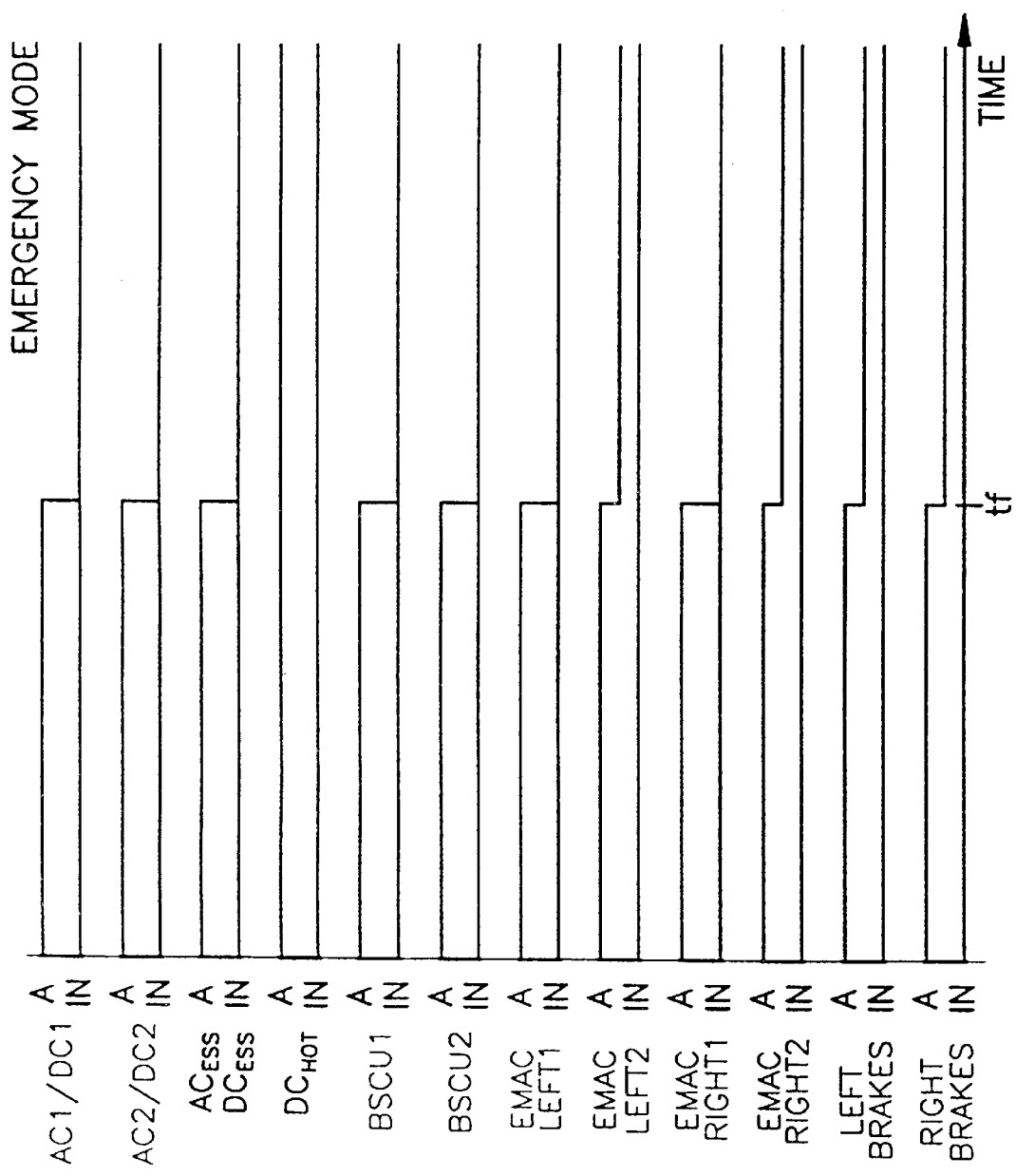
FIG. 4C is a timing diagram illustrating operation of the electromechanical braking system in an emergency braking mode in which all primary power sources have failed.

FIG. 4C illustrates the emergency mode where all the primary power sources PWR1, PWR2 and PWRess fail at or before time tf. In such case, both BSCUs 40 become disabled as does EMAC Left1 and EMAC Right1. Only EMAC Left2 and EMAC Right2 remain active on a limited basis by virtue of the DChot power source. EMAC Left2 and EMAC Right2 are configured to recognize such condition and are designed to operate under condition on the brake commands provided directed thereto from the transducers 46 via cable 72.

Under such condition, only actuator modules 2 and 4 remain active in each brake 34. EMAC Left2 and EMAC Right2 are designed to use the pedal input commands received directly from the transducers 46 to achieve proportional brake force application using the actuator modules 2 and 4 in each brake 34. Such pedal input commands may derive power from the DChot source via the connecting cables 72 and 48, and the system 30 preferably is designed to provide the most direct electrical path between the transducers 46 and the brakes 34 to minimize the number of intermediate components, and hence decrease the possibility of component failure in that path.

Since only actuator modules 2 and 4 remain active in each brake, it is preferable that EMAC Left2 and EMAC Right2 be configured to control the upper force limit of each actuator module under such condition in order to optimize braking while avoiding wheel lock-up since antiskid protection is not available. In addition to controlling the upper force limit, or in the alternative, the EMACs 44 may be configured to operate the actuator modules in a pulse mode to avoid wheel lock-up. It is noted that in the emergency mode, both BSCUs 40 are disabled, and hence antiskid protection is not available.

Park (Ultimate) Mode

Figure 4D:
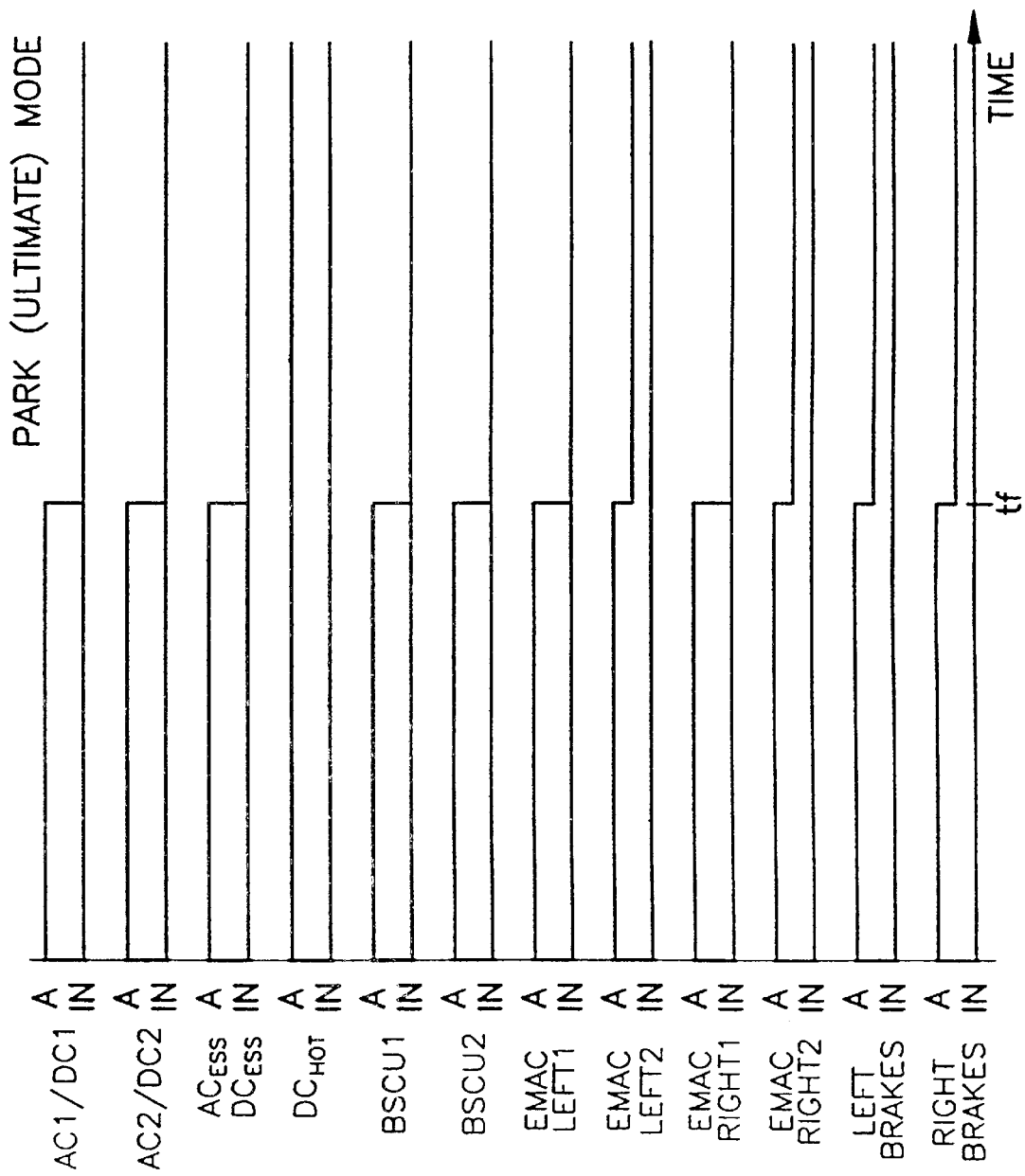
FIG. 4D is a timing diagram illustrating operation of the electromechanical braking system in a park (ultimate) braking mode in which all primary power sources are unavailable.

In the park (ultimate) mode, only power from the DChot source is available as represented in FIG. 4D. This may be because the aircraft 32 is on the ground with the remaining power systems shut down. Alternatively, all the primary power busses PWR1, PWR2 and PWRess may have failed similar to the emergency mode discussed above.

For the same reasons discussed above in relation to FIG. 4C and the emergency mode, only EMAC Left2 and EMAC Right2 remain active in the park (ultimate) mode. Moreover, these particular EMACs are only partially active in the sense that they are operating based on power from the DChot source. Operation differs from the emergency mode in the following respects.

As mentioned above, the cockpit includes a parking brake switch selectively activated by the pilot. The parking brake switch is coupled to EMAC Left2 and EMAC Right2 via the cables 48 and 72, for example. EMAC Left2 and EMAC Right2 are both configured to provide a predetermined fixed braking force via the enabled actuator modules 2 and 4 in each of the brakes 34 upon closing of the parking brake switch. Power from the DChot source is used only to actuate the actuator modules 2 and 4 into position. Thereafter, a mechanical holding device within the actuator module holds the actuator mechanism in place so as to no longer require power from the DChot source. In this manner, the park mode uses power only during activation or when the park brake is released in order to conserve power in the aircraft battery.

Release of the parking brake is implemented by removing the brake clamping force as a result of the EMAC Left2 and EMAC Right2 disabling the mechanical holding device and driving each actuator module 2 and 4 to a running clearance position. Specifically, the parking brake switch in the cockpit being moved to a release position causes the EMAC Left2 and EMAC Right2 to release the parking brake.

The park (ultimate) mode is considered to be a final means of applying brakes in an aircraft emergency situation in order to stop the aircraft. The EMACs are configured preferably such that the park mode overrides any normal braking commands unless the normal braking command torque level is higher than the park torque level. If the remainder of the system 30 fails due to the BSCUs 40 or the main power busses PWR1, PWR2 and PWRess failing, for example, it is noted that operation of the park (ultimate) mode is neither prevented nor delayed.

Figure 5A:
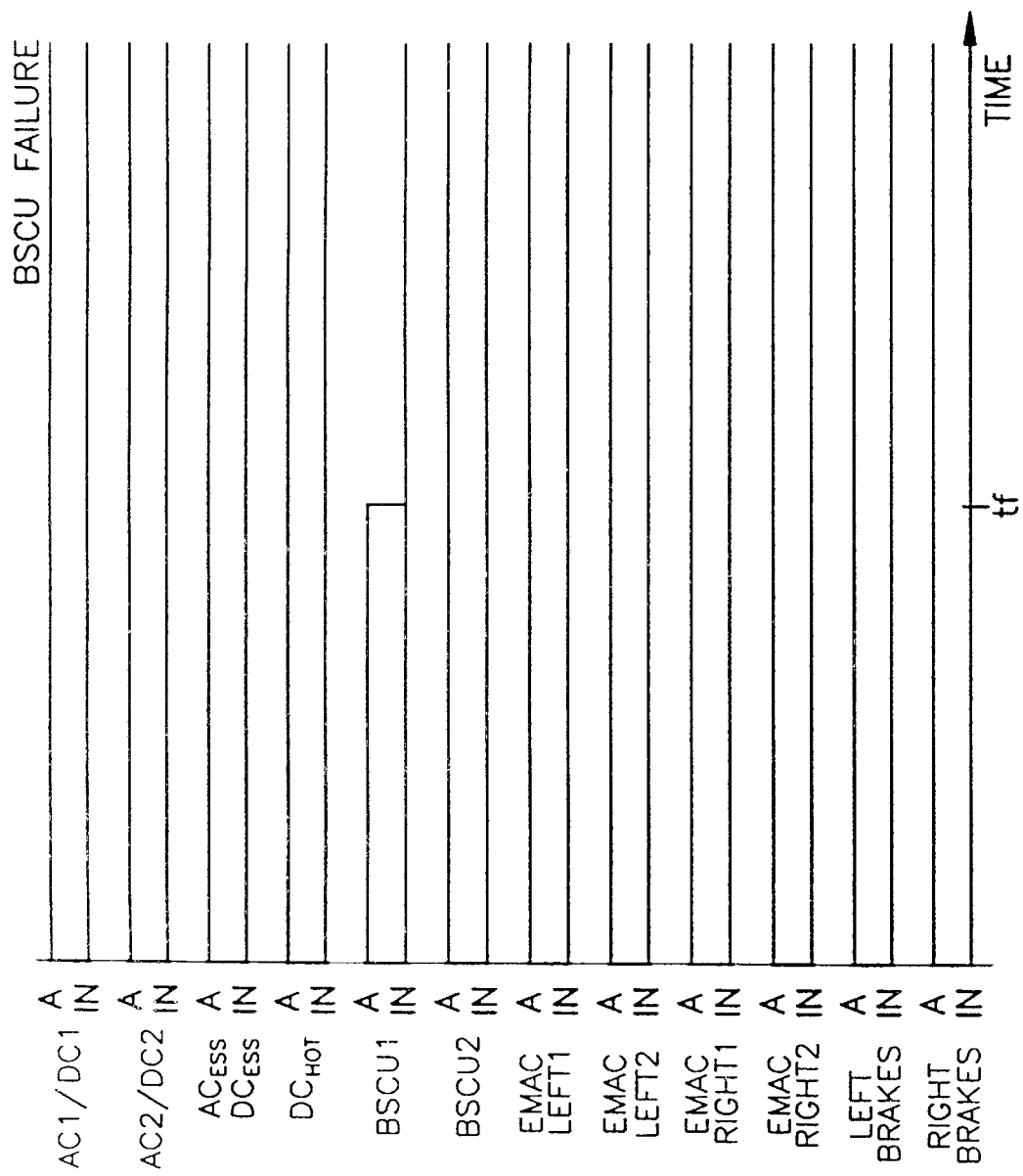
FIG. 5A is a timing diagram illustrating operation of the electromechanical braking system during failure of a brake system control unit.

Referring now to FIG. 5A, a case where one of the BSCUs 40 fails is illustrated. For example, FIG. 5A shows how BSCU1 may fail at time tf due to component failure. Since BSCU1 and BSCU2 are redundant, the EMACs 44 will continue to receive brake commands from BSCU2. Hence, the system 30 will continue to operate in a normal mode. Although not shown, if BSCU2 were also to fail for some reason (e.g., component failure), the EMACs 44 are configured to revert to emergency mode operation. More specifically, in the absence of commands from the BSCUs 40, EMAC Left2 and EMAC Right2 are configured to operate proportionally in the emergency mode based on the direct inputs from the brake pedal transducers 46 as described above.

Figure 5B:
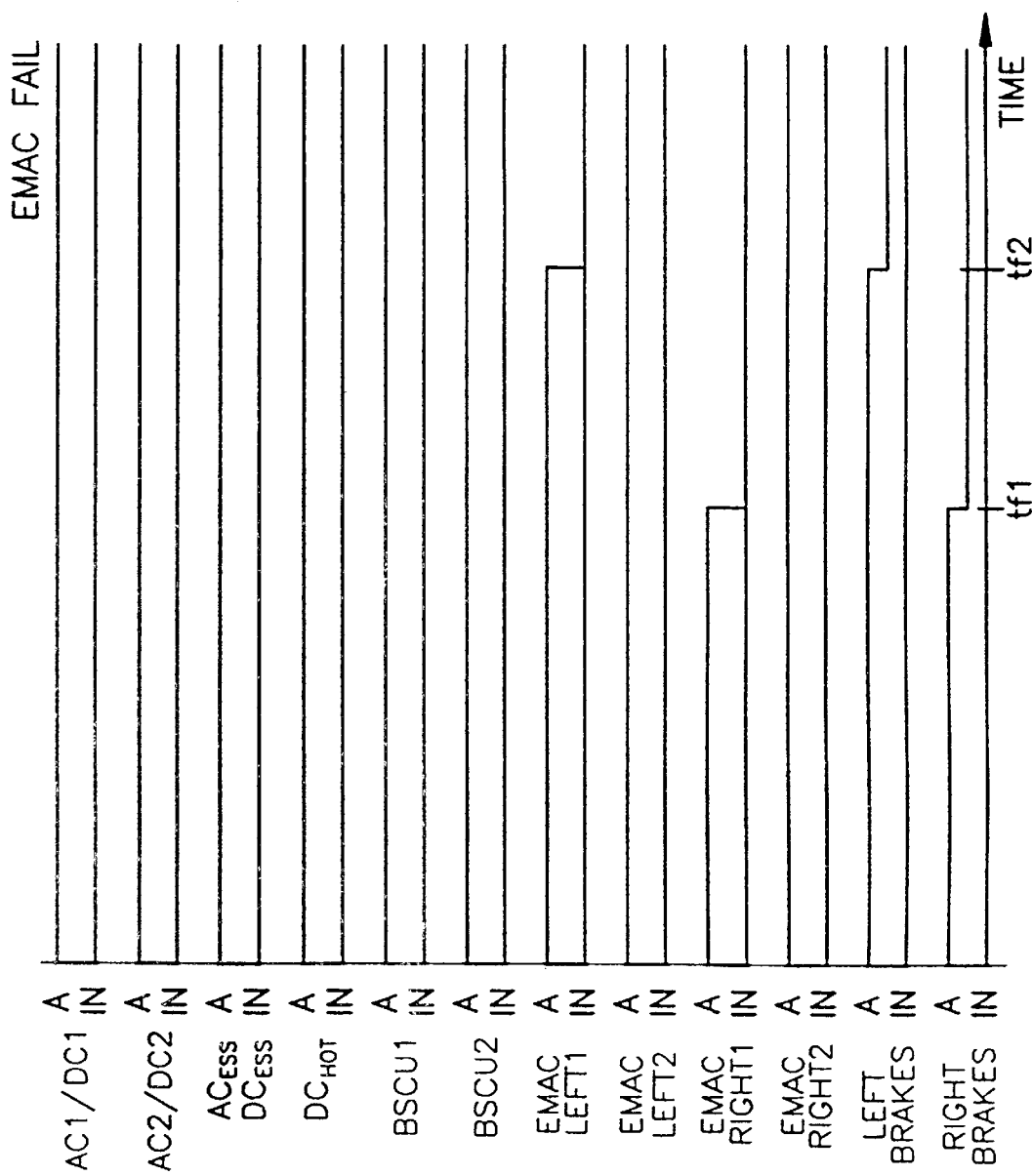
FIG. 5B is a timing diagram illustrating operation of the electromechanical braking system during failure of an electromechanical actuator controller.

FIG. 5B illustrates how if EMAC Right1 fails at time tf1 due to component failure, for example, the remaining EMACs 44 continue to operate such that the right brakes continue to provide at least partial braking. If EMAC Left1 were to then fail at time tf2, for example, partial braking would again still be available in the left brakes. Thus, the present invention provides protection against component failure much in the same way as protection against failure of the power systems.

Figure 6:
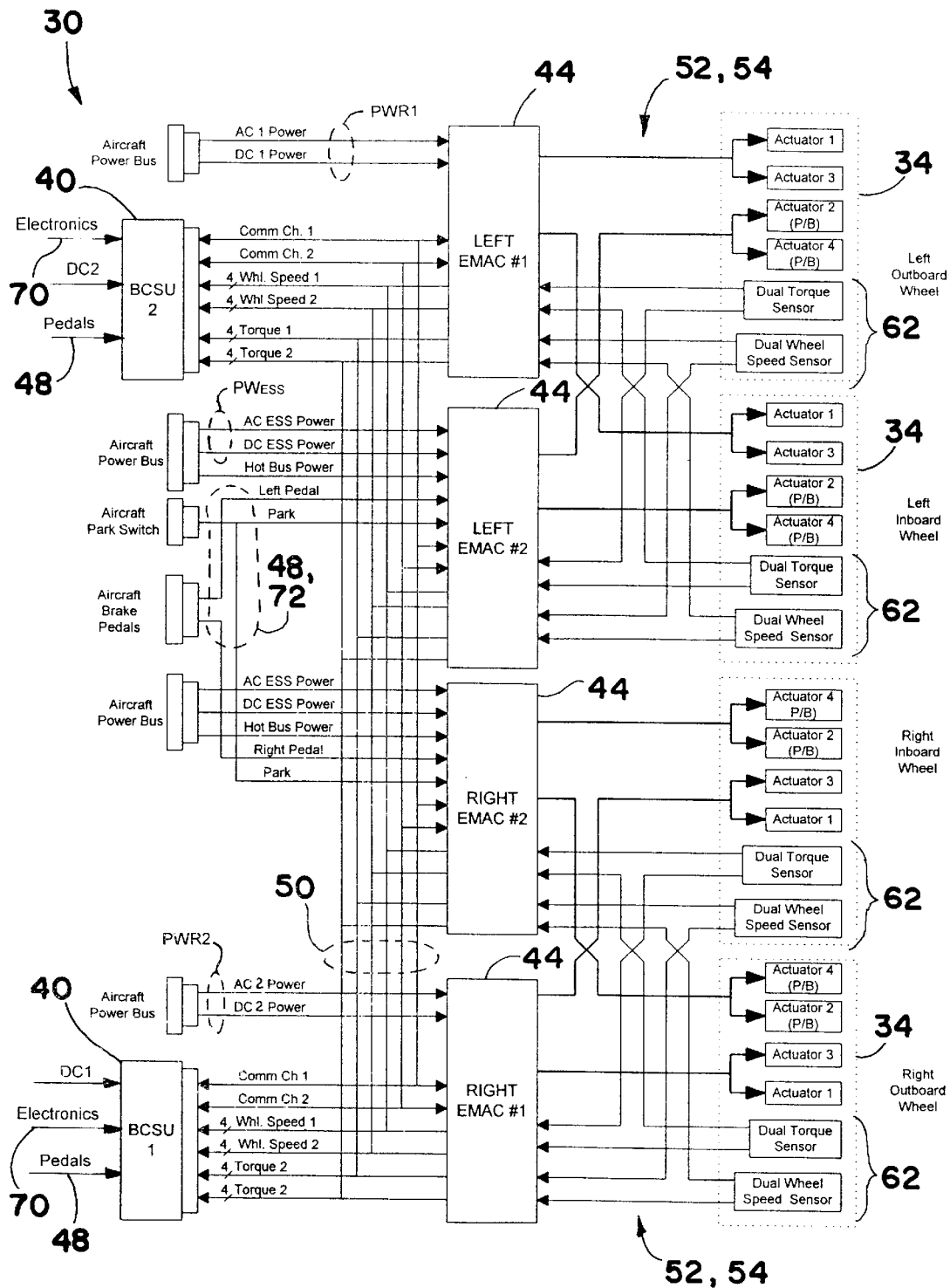
FIG. 6 is a detailed block diagram of a particular embodiment of an electromechanical braking system in accordance with the present invention.
Figure 7:
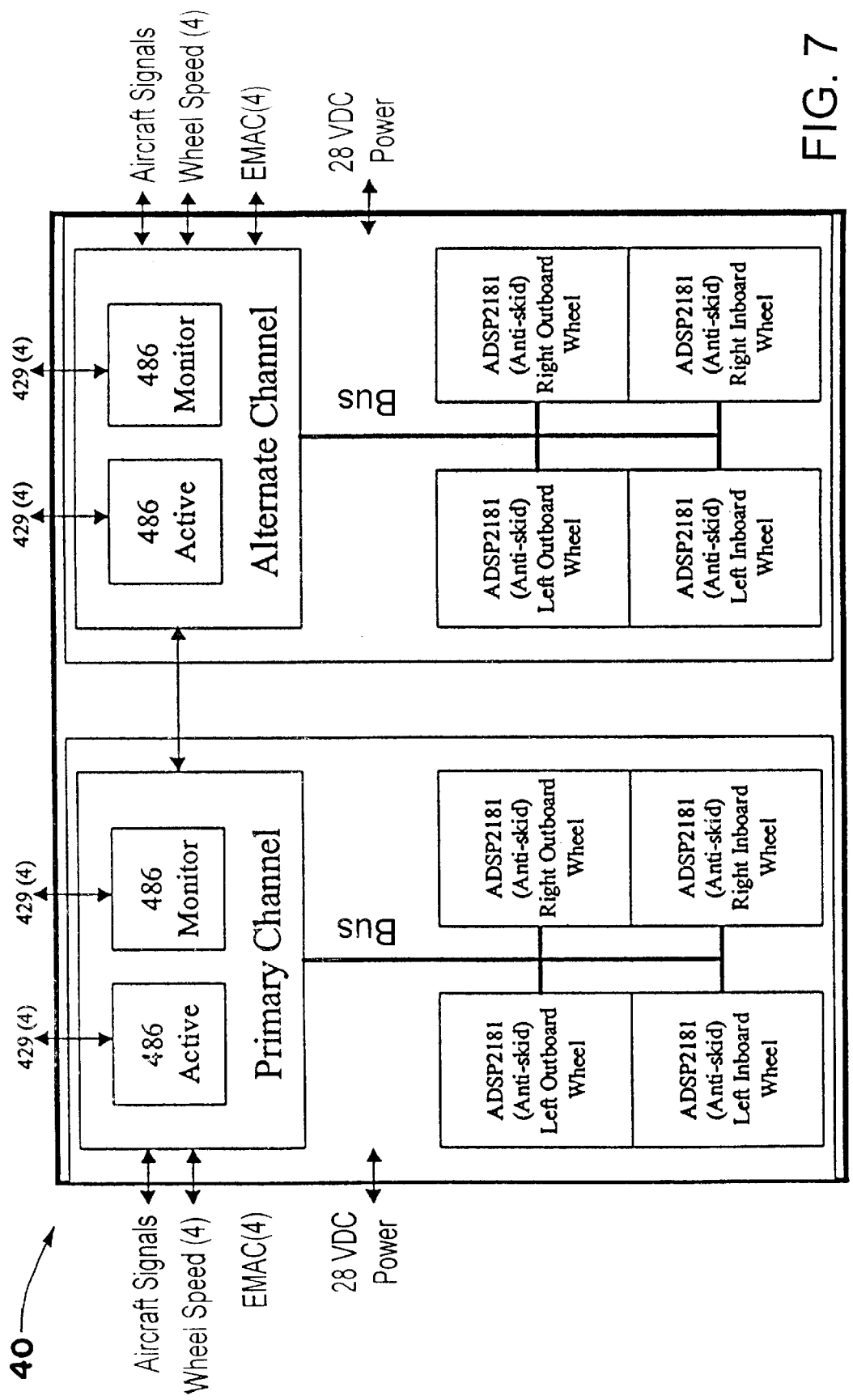
FIG. 7 is a detailed block diagram of a particular embodiment of a brake system control unit in accordance with the present invention.
Figure 8:
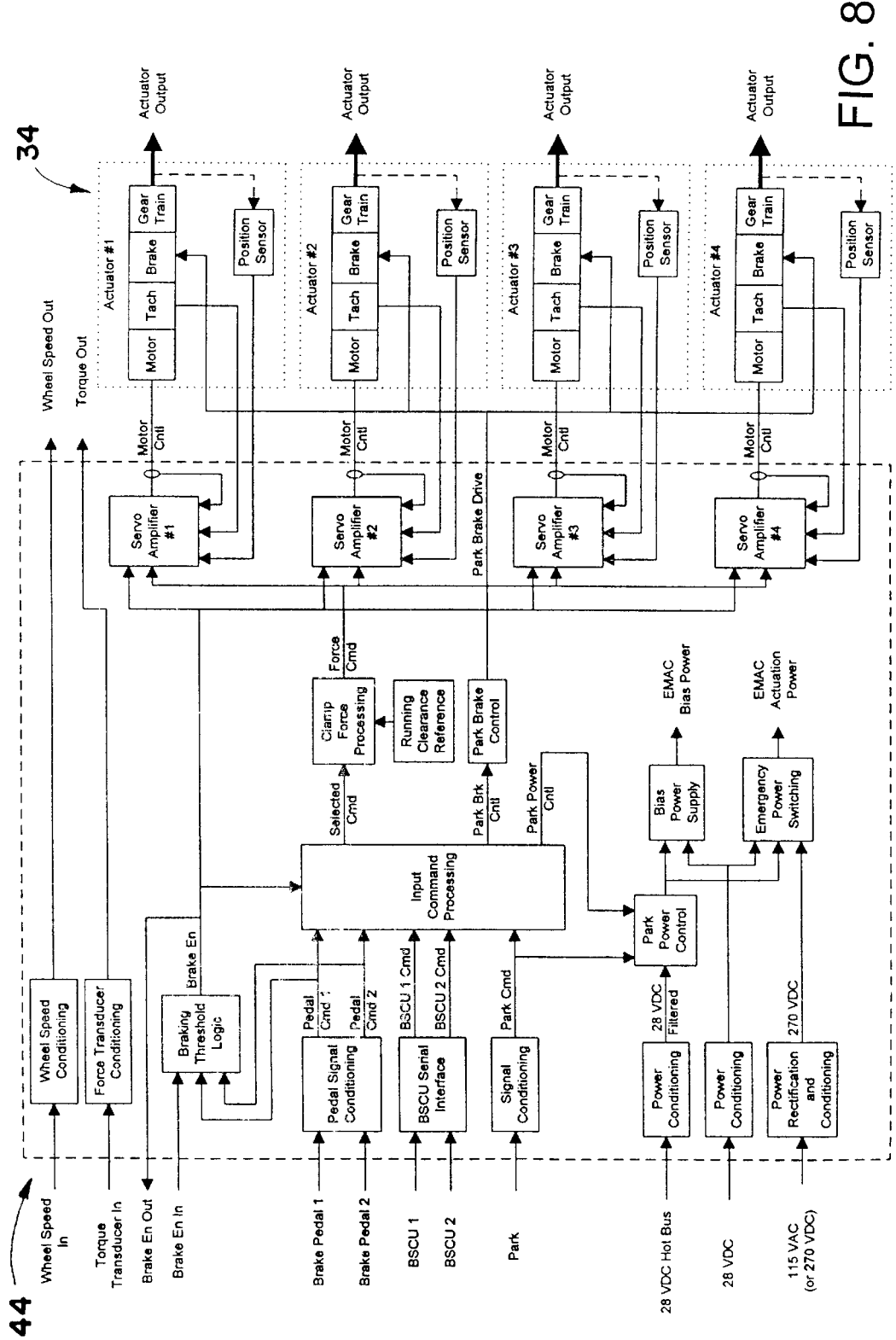
FIG. 8 is a detailed block diagram of a particular embodiment of an electromechanical actuator controller in accordance with the present invention.

FIG. 6 illustrates in detail the particular configuration of the braking system 30 in accordance with one example of the present invention. FIG. 7 represents an exemplary architecture for the BSCUs 40. However, it will be appreciated that each BSCU 40 can have a variety of configurations yet still satisfy the objects of the invention. FIG. 8 represents an exemplary design of an EMAC 44 and actuator 34 for carrying out the above described functions. Again, however, the particular design illustrated in FIG. 8 is not intended to limit the scope of the invention. For example, the actuator 34 may utilize force sensors in place of position sensors.

Figure 9:
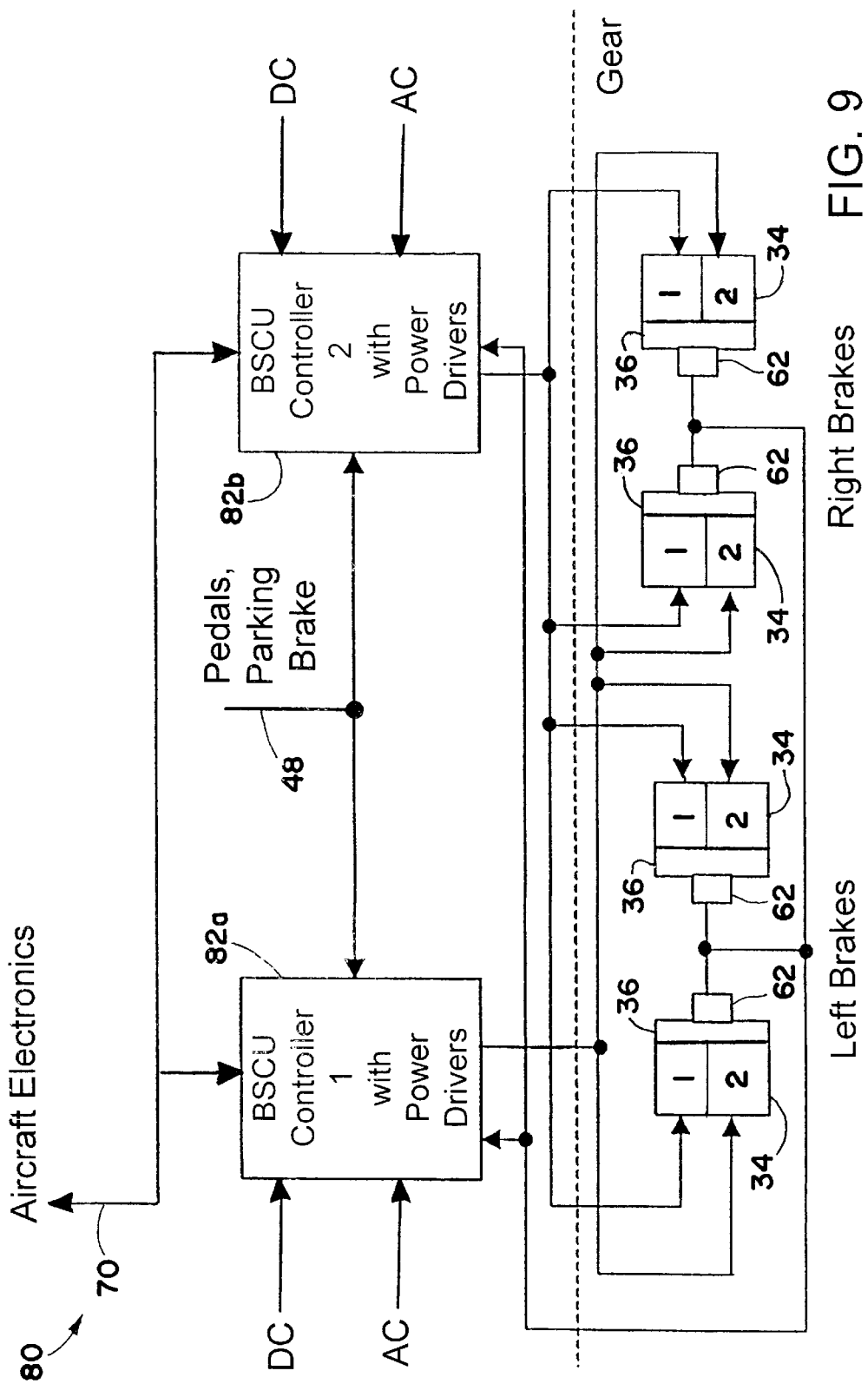
FIG. 9 is a detailed block diagram of an electromechanical braking system in accordance with another embodiment of the present invention.
Figure 10:
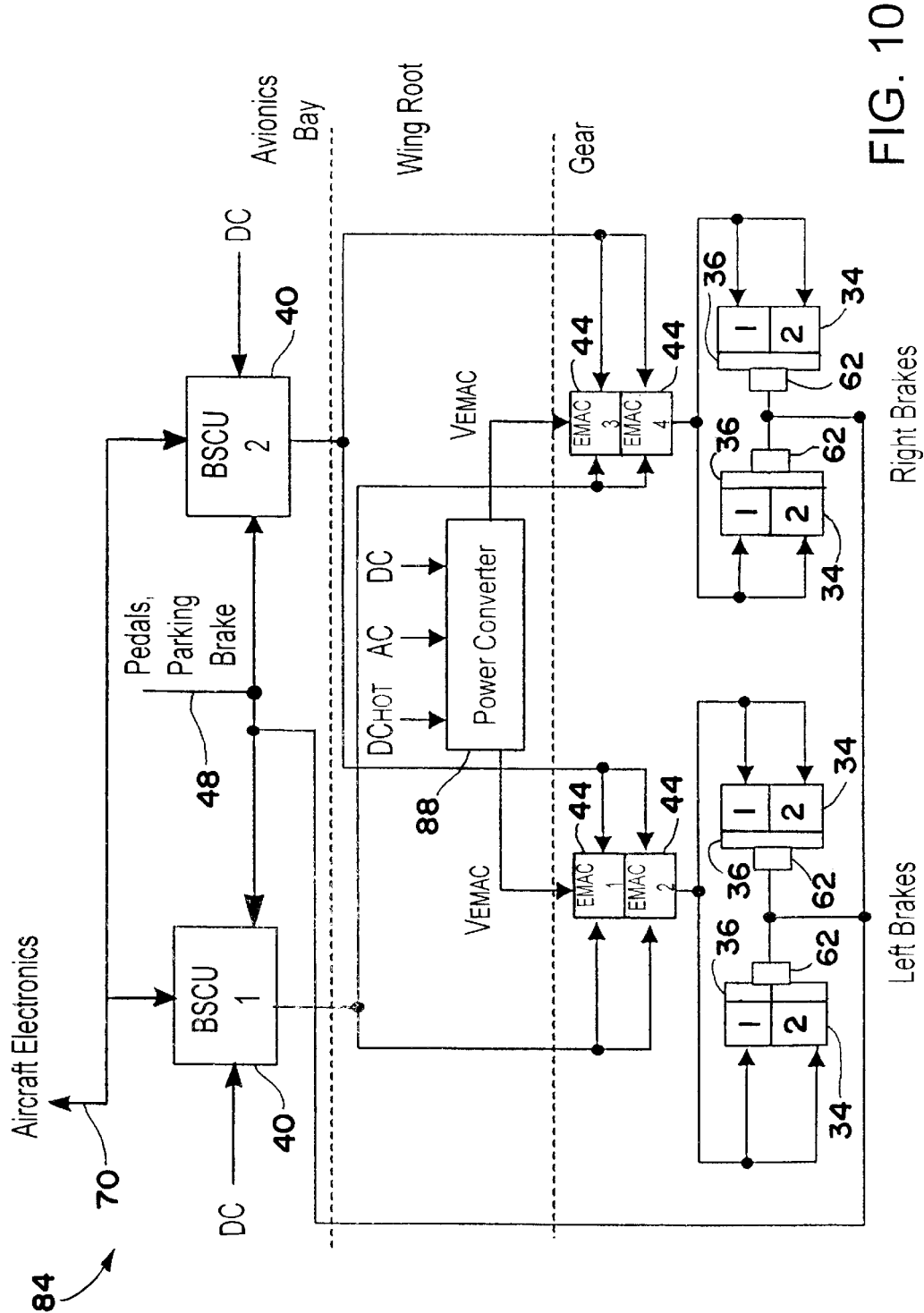
FIG. 10 is a detailed block diagram of an electromechanical braking system in accordance with a third embodiment of the present invention.
Figure 11:
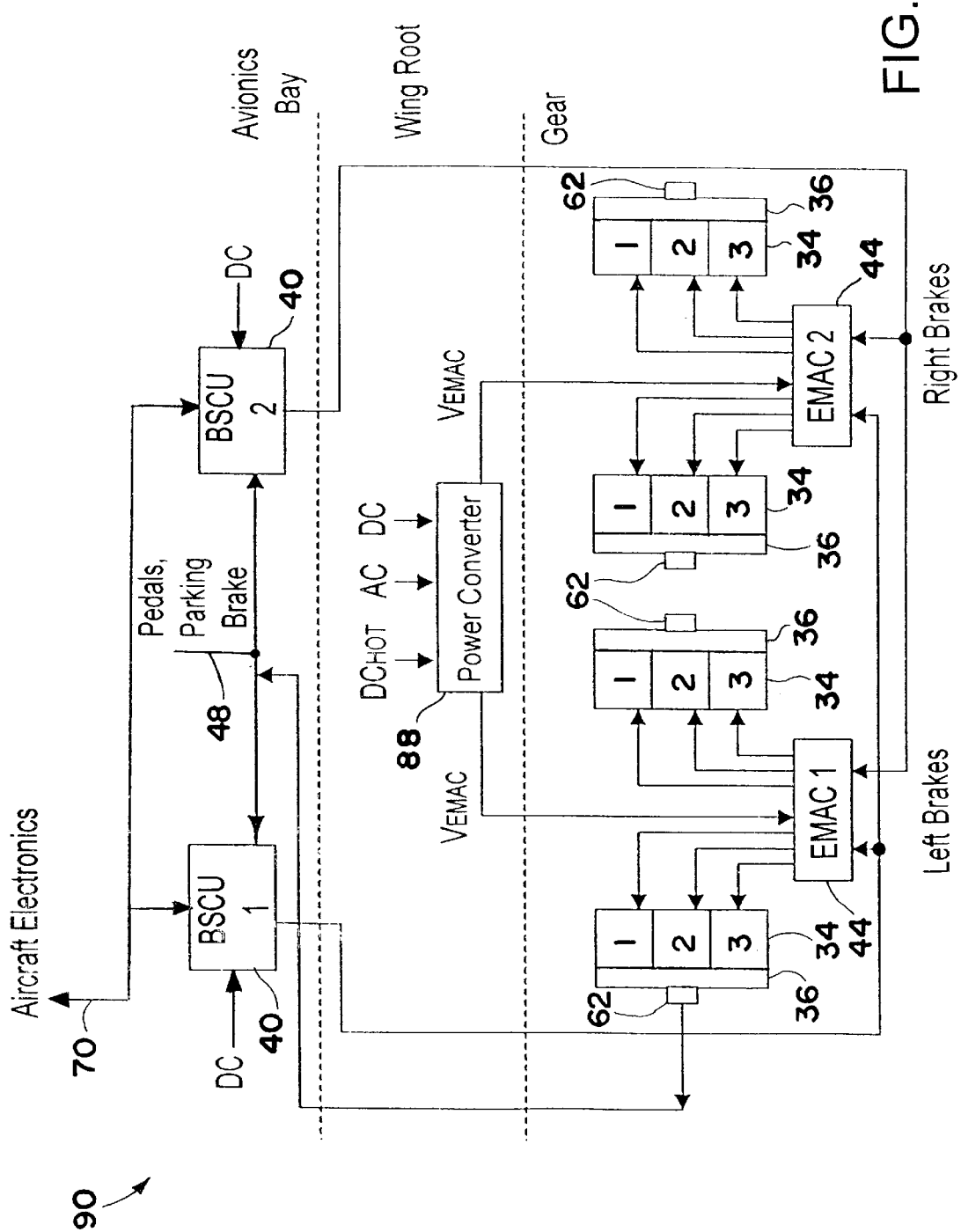
FIG. 11 is a detailed block diagram of an electromechanical braking system in accordance with a fourth embodiment of the present invention.

Turning now to FIGS. 9–11, alternative embodiments of the present invention will now be discussed. Referring initially to FIG. 9, an electromechanical braking system which incorporates redundant centralized controllers with power drive circuits is designated 80. In the exemplary embodiment, the system 80 includes two identical centralized controllers 82a and 82b. Each controller 82a and 82b includes a BSCU controller as discussed above, combined with power drive circuits (EMACs) for each brake actuator to be driven by the BSCU controller. Thus, in the embodiment of FIG. 9 the BSCU 40 and EMACs 44 are combined into a centralized controller 82.

As shown in FIG. 9, the controllers 82a and 82b are redundant in that each receives brake commands from the transducers 46 via cable 48. The output of each controller 82a and 82b is coupled to the brake actuator modules 1 and 2 for each wheel 36 in both the left wheel brakes and the right wheel brakes. The outputs from the torque and wheel speed sensors 62 for each of the wheels 36 is coupled to both controllers 82a and 82b.

Each controller 82a and 82b processes the brake commands received via cable 48 and outputs brake actuator drive signals to the actuator modules 1 and 2 for each wheel, thus providing a fundamental form of redundancy. If the BSCU in one of the controllers (e.g., 82a) was to fail, the BSCU in the other controller (e.g., 82b) would still function to provide full braking capabilities. If a given EMAC within one of the controllers 82 was to fail, the corresponding EMAC in the other controller would still be available to provide the necessary drive signals to the respective brake actuator module.

The controllers 82a and 82b preferably are contained in their own respective enclosures within the aircraft. Power is provided to the respective controllers 82a and 82b via different power busses as in the previous embodiment, or via the same power buss. The advantage of providing power via different power busses is that if one power buss was to fail, the controller 82 driven by the other power buss would remain active.

FIG. 10 shows an electromechanical braking system 84 which utilizes redundant BSCUs 40 as in the embodiment of FIG. 3. In addition, the left brakes and the right brakes each include redundant EMACs 44. In this embodiment, however, the EMACs 44 are located within the landing gear adjacent the actuators 34. Moreover, power is provided from a centralized power converter located withing the root of the wing of the aircraft.

More particularly, redundant BSCUs 1 and 2 receive brake command signals from the transducers 46 via cable 48 as in the previous embodiments. The BSCUs 1 and 2 provide brake control signals to each of a plurality of redundant EMACs 44 included for each of the left wheel brakes and the right wheel brakes. In the exemplary embodiment, the left wheel brakes are controlled by two EMACs, namely EMAC1 and EMAC2. The right wheel brakes are controlled by two EMACs, namely EMAC3 and EMAC4. EMAC1 and EMAC2 each receive brake control signals from both BSCUs 1 and 2, and provide redundant drive signals to each of actuators 1 and 2 for both left wheels 36. Similarly, EMAC3 and EMAC4 each receive brake control signals from both BSCUs, and provide redundant drive signals to each of actuators 1 and 2 in both right wheels 36.

If one of the BSCUs (e.g., BSCU1) was to fail in the embodiment of FIG. 10, full brake control would still be available by virtue of the other BSCU (e.g., BSCU2). If one of the EMACs (e.g., EMAC3) was to fail, the other EMAC (e.g., EMAC4) would still be available to provide the appropriate drive signals to the actuators.

Power is provided to the BSCUs via different power busses as in the embodiment of FIG. 3, or the same power buss as discussed above. In the exemplary embodiment, power is provided to the EMACs via a power converter 88 located in the wing root of the aircraft. The converter 88 receives AC and DC power from one or more power busses and converts the power into a operating line voltage Vemac which is delivered to EMACs 1 thru 4. Preferably, the converter 88 is designed to receive power from two or more different power busses in order to provide redundancy in the event one of the power busses was to fail.

FIG. 11 illustrates another embodiment of an electromechanical braking system which is designated 90. Similar to the embodiment of FIG. 10, the system 90 includes redundant BSCUs 1 and 2 for processing brake commands received from the pedal transducers via cable 48. The EMACs 44 are again located in the landing gear adjacent the brake actuator modules which, in this example, consist of three actuator modules 1–3 per wheel 36. EMAC1 receives brake control signals from both BSCU1 and BSCU2, and in turn drives actuators 1 thru 3 for the left wheels. EMAC2 also receives brake control signals from both BSCU1 and BSCU2, and instead drives actuators 1 thru 3 in connection with the right wheels. In this example, the EMACs are located at the bottom of the landing gear, closer to the respective actuator modules 1–3. This allows the length of the power cables between the EMACs and the actuator modules to be minimized.

The various embodiments described herein provide for different levels of redundancy in the event of equipment failure, power failure, or both. In many instances a particular number of redundant BSCUs, EMACs, etc. are described. However, it will be appreciated that different numbers of redundancy in BSCUs, EMACs, etc., are possible depending upon the number of wheels, brakes, actuators, etc. The present invention is intended to include any and all such possible numbers.

Although the invention has been shown and described with respect to certain preferred embodiments, it is obvious that equivalents and modifications will occur to others skilled in the art upon the reading and understanding of the specification. For example, although the present invention has clear utility in connection with an aircraft, the braking system described herein can also be used on other type vehicles without departing from the scope of the invention. The present invention includes all such equivalents and modifications.

What claim is:

1. An electromechanical braking system, comprising:
   at least one electromechanical brake actuator for directly converting an electrical drive control signal into mechanical energy to effect a braking torque on a wheel of a vehicle; and
   a plurality of brake controllers for providing electrical drive control signals to the at least one electromechanical brake actuator in response to an input brake command signal to effect the braking torque, the plurality of brake controllers being configured to function redundantly so as to provide the drive control signals to effect the braking torque even in the event one of the plurality of brake controllers becomes inoperative,
   wherein substantially full braking torque is maintained by temporarily overdriving individual actuator motors in the event one of the plurality of brake controllers becomes inoperative.

2. An electromechanical braking system, comprising:
   a plurality of brake actuators for directly converting an electrical drive control signal into mechanical energy to effect a braking torque on wheels of a vehicle;
   a plurality of electromechanical actuater controllers (EMACs) for providing electrical drive control of the brake actuator in response to brake clamp force command signals; and
   at least one brake control unit (BSCU) for converting an input brake command signal into the brake clamp force command signals which are provided to the EMACs,
   wherein at least two of the plurality of EMACs are configured to function redundantly in providing drive control to the brake actuators in response to the brake clamp force command signals, and
   the system includes a plurality of BSCUs, and at least two of the BSCUs function redundantly in providing brake clamp force command signals to the EMACs.

3. The system of claim 1, wherein in an event one of the plurality of EMACs becomes inoperative braking torque still is effected on the wheels of the vehicle by virtue of another of the plurality of EMACs and the plurality of brake actuators.

4. The system of claim 3, wherein each of the plurality of EMACs provide drive control to a same set of the brake actuators on a given wheel of the vehicle.

5. The system of claim 2, wherein the vehicle is an aircraft.

6. An electromechanical braking system, comprising:
   a plurality of brake actuators for directly converting an electrical drive control signal into mechanical energy to effect a braking torque on wheels of a vehicle;
   a plurality of electromechanical actuator controllers (EMACs) for providing electrical drive control of the brake actuators in response to brake clamp force command signals; and
   at least one brake control unit (BSCU) for converting an input brake command signal into the brake clamp force command signals which are provided to the EMACs,
   wherein at least two of the plurality of EMACs are configured to function redundantly in providing drive control to the brake actuators in response to the brake clamp force command signals,
   in an event one of the plurality of EMACs becomes inoperative braking torque still is effected on the wheels of the vehicle by virtue of another of the plurality of EMACs and the plurality of brake actuators, and
   each of the plurality of EMACs provide drive control to a corresponding different set of the brake actuators on a given wheel of the vehicle.

7. The system of claim 6, wherein if one of the plurality of EMACs becomes inoperative, a maximum brake torque applied by one of the electromechanical brake actuators driven via another of the EMACs is increased.

8. An electromechanical braking system, comprising:

a plurality of brake actuators for effecting a braking torque on wheels of a vehicle;

at least one electromechanical actuator controller (EMAC) for providing drive control of the brake actuators in response to brake clamp force and command signals; and a plurality of brake control units (BSCUs) for converting an input brake command signal into the brake clamp force command signals which are provided to the at least one EMAC, wherein at least two of the, plurality of BSCUs are configured to function redundantly in providing the brake clamp force command signals to the at least one EMAC in response to the input brake command signal.

9. The electromechanical braking system of claim 8, wherein each BSCU shares a common housing with a corresponding EMAC.

10. The electromechanical braking system of claim 8, wherein the input brake command signal is proportional.

11. The electromechanical braking system of claim 8, wherein the BSCUs each perform antiskid operations in relation to the input brake command signal.

12. The electromechanical braking system of claim 8, wherein full braking is available even in the event one of the BSCUs becomes inoperative.

13. The electromechanical braking system of claim 8, wherein in the event one of the BSCUs or EMACs becomes inoperative, a maximum brake torque applied by one of the brake actuators via another of the BSCUs and EMACs is increased.

14. The electromechanical braking system of claim 8, wherein the EMACs are configured to operate on power received from both an AC power bus and a DC power bus.

15. The system of claim 8, wherein each of the plurality of BSCUs functions to provide antiskid control in relation to the input brake command signal.

16. The system of claim 8, wherein the vehicle is an aircraft.

\* \* \* \* \*